(12) United States Patent
Chono et al.

(10) Patent No.: US 10,021,385 B2
(45) Date of Patent: Jul. 10, 2018

(54) VIDEO ENCODING DEVICE, VIDEO DECODING DEVICE, VIDEO ENCODING METHOD, VIDEO DECODING METHOD, AND PROGRAM

(75) Inventors: Keiichi Chono, Tokyo (JP); Yuzo Senda, Tokyo (JP); Hirofumi Aoki, Tokyo (JP); Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 572 days.

(21) Appl. No.: 13/976,308

(22) PCT Filed: Dec. 22, 2011

(86) PCT No.: PCT/JP2011/007204
§ 371 (c)(1),
(2), (4) Date: Jul. 25, 2013

(87) PCT Pub. No.: WO2012/090454
PCT Pub. Date: Jul. 5, 2012

(65) Prior Publication Data
US 2013/0294510 A1 Nov. 7, 2013

(30) Foreign Application Priority Data
Dec. 27, 2010 (JP) .................. 2010-289940

(51) Int. Cl.
*H04N 7/32* (2006.01)
*H04N 19/50* (2014.01)
(Continued)

(52) U.S. Cl.
CPC ..... *H04N 19/00569* (2013.01); *H04N 19/117* (2014.11); *H04N 19/154* (2014.11);
(Continued)

(58) Field of Classification Search
CPC .......................... H04N 19/176; H04N 19/11
See application file for complete search history.

(56) References Cited

U.S. PATENT DOCUMENTS

| | | | |
|---|---|---|---|
| 2005/0201629 A1* | 9/2005 | Karczewicz ... | H04N 21/234327 382/240 |
| 2006/0133481 A1* | 6/2006 | Chujoh .......... | H04N 19/176 375/240.03 |
| 2009/0086816 A1* | 4/2009 | Leontaris et al. | 375/240.03 |

FOREIGN PATENT DOCUMENTS

| | | |
|---|---|---|
| TW | 201029474 A1 | 8/2010 |
| WO | 2009/003499 A1 | 1/2009 |

OTHER PUBLICATIONS

Keiichi Chono et al., "Description of video coding technology proposal by NEC Corporation", Joint Collaborative Team on Video Coding (JTC-VC) of ITU-T SG-16 WP3 and ISO/IEC JTC1/SC29/WG11, JCTVC-A104, 1st Meeting: Dresden, DE, Apr. 2010, pp. 1-8, 14-18.

(Continued)

*Primary Examiner* — Zhubing Ren
(74) *Attorney, Agent, or Firm* — Sughrue Mion, PLLC

(57) ABSTRACT

A video encoding device includes a planar prediction unit using planar prediction, and a noise injecting unit for injecting pseudo-random noise into a prediction image of a planar prediction block when a reconstructed prediction error value for planar prediction is less than a threshold determined by the size of the planar prediction block. The video encoding device then uses the pseudo-random noise in linear interpolation for calculating the prediction image, based on the conditions under which a gradient distortion occurs, to suppress the gradient distortion.

8 Claims, 10 Drawing Sheets

(51) Int. Cl.
H04N 19/176 (2014.01)
H04N 19/593 (2014.01)
H04N 19/117 (2014.01)
H04N 19/154 (2014.01)
H04N 19/82 (2014.01)
H04N 19/61 (2014.01)

(52) U.S. Cl.
CPC ......... H04N 19/176 (2014.11); H04N 19/593 (2014.11); H04N 19/82 (2014.11); *H04N 19/61* (2014.11)

(56) References Cited

OTHER PUBLICATIONS

Kemal Ugur et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11, JCTVC-A119, 1st Meeting: Dresden, DE, Apr. 2010, pp. 1, 5-7.

Greg Conklin et al., Dithering 5-tap Filter for Inloop Deblocking, Joint Video Team (JVT) of ISO/IEC MPEG & ITU-T VCEG (ISO/IEC JTC1/SC29/WG11 and ITU-T SG16 Q.6), JVT-C056, 3rd Meeting: Fairfax, Virginia, USA, May 2002, pp. 1-13.

Jani Lainema et al., "Intra picture coding with planar representations", 28$^{th}$ Picture Coding Symposium (PCS2010), Aug. 12, 2010, pp. 198-201.

"Information technology—Coding of audio-visual objects" International Standard ISO/IEC 14496-10, Advanced Video Coding, 5th Edition, May 15, 2009.

"Test Model under Consideration", Output Document (draft000), Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 2010, pp. 1-6, 58,104-105.

International Search Report of PCT/JP2011/007204 dated Mar. 27, 2012.

Communication dated Apr. 2, 2018, from the Intellectual Property Office of India in counterpart application No. 4953/CHENP/2013.

* cited by examiner

VIDEO ENCODING DEVICE, VIDEO DECODING DEVICE, VIDEO ENCODING METHOD, VIDEO DECODING METHOD, AND PROGRAM

This is a National Stage Entry of Application No. PCT/JP2011/007204 filed Dec. 22, 2011, claiming priority based on Japanese Patent Application No. 2010-289940 filed Dec. 27, 2010, the contents of all of which are incorporated herein by reference in their entirety.

TECHNICAL FIELD

The present invention relates to a video encoding device to which a video encoding technique is applied, and a video decoding device.

BACKGROUND ART

In general, after digitizing a moving image signal externally input, a video encoding device executes an encoding process that conforms to a predetermined video coding scheme to generate coded data, i.e. a bitstream.

As the predetermined coding scheme, there is ISO/IEC 14496-10 Advanced Video Coding (AVC) described in Non Patent Literature (NPL) 1. As a reference model of an AVC encoder, Joint Model scheme is known (hereinafter called a general video encoding device).

Referring to FIG. 8, the operation of the general video encoding device that receives each frame of digitized video as input and outputs a bitstream is described below.

The video encoding device shown in FIG. 8 includes a transformer/quantizer 102, an entropy encoder 103, an inverse transformer/inverse quantizer 104, a picture buffer 105, a decoded picture buffer 106, a quantizer/inverse quantizer 107, an adaptive linear interpolator 108, an inter-frame predictor (inter predictor) 110, an intra predictor 111, an encoding controller 112, a switch 121, and a switch 122.

The general video encoding device divides each frame into blocks of 16×16 pixel size called macro blocks (MBs), and further divides each MB into blocks of 4×4 pixel size to set the 4×4 blocks as the minimum unit of encoding.

FIG. 9 is an explanatory diagram showing an example of block division in the case where the frame has a spatial resolution of QCIF (Quarter Common Intermediate Format).

The following describes the operation of each unit shown in FIG. 8.

A prediction signal supplied from the intra predictor 111 or the inter-frame predictor 110 is subtracted from MB block-divided input video, and the result is input to the transformer/quantizer 102. The prediction signal is an intra prediction signal or an inter-frame prediction signal. The MB block from which the prediction signal is subtracted is called a prediction error image block below.

The intra predictor 111 generates the intra prediction signal using a reconstructed image stored in the picture buffer 105 and having the same display time as a current frame. The MB encoded using the intra prediction signal is called an intra MB below.

The inter-frame predictor 110 generates the inter-frame prediction signal using a reference image different in display time from the current frame and stored in the decoded picture buffer 106. The MB encoded using the inter-frame prediction signal is called an inter MB below.

A frame encoded by including only intra MBs is called an I frame. A frame encoded by including not only intra MBs but also inter MBs is called a P frame. A frame encoded by including inter MBs that use not only one reference image but two reference images simultaneously to generate the inter-frame prediction signal is called a B frame.

The encoding controller 112 compares the intra prediction signal and the inter-frame prediction signal with an input MB stored in an MB buffer, and selects a prediction signal that reduces the energy of a prediction error image block to control the switch 122. Information associated with the selected prediction signal (the intra prediction mode, the intra prediction direction, and information associated with inter-frame prediction) is supplied to the entropy encoder 103.

Based on the input MB or the prediction error image block, the encoding controller 112 also selects a base block size of integer DCT (Discrete Cosine Transform) suitable for frequency transform of the prediction error image block. In the general video encoding device, the integer DCT means frequency transform by a base obtained by approximating the DCT base with an integer value. The options of base block size include three block sizes of 16×16, 8×8, and 4×4. A larger base block size is selected as the pixel values of the input MB or the prediction error image block are flattened. Information on the selected integer DCT base size is supplied to the entropy encoder 103. Hereafter, the information associated with the selected prediction signal, the information on the selected integer DCT base size, and a quantization parameter to be described later are called auxiliary information.

The inverse transformer/inverse quantizer 104 inverse-quantizes a transform/quantization value with a quantization step width Qs. The inverse transformer/inverse quantizer 104 further performs inverse frequency transform of a frequency transform coefficient obtained by the inverse quantization. The prediction signal (the intra prediction signal or the inter prediction signal) is added to a reconstructed prediction error image obtained by the inverse frequency transform, and the result is supplied to the picture buffer 105 through the switch 121. The operation of the quantizer/inverse quantizer 107 and the linear interpolator 108 will be described later.

A reconstructed image block in which the prediction signal is added to the reconstructed prediction error image block is stored in the picture buffer 105 until all the MBs contained in the current frame are encoded. A picture composed of a reconstructed image in the picture buffer 105 is called a reconstructed image picture below.

The entropy encoder 103 entropy-encodes the auxiliary information and the quantization index, and outputs the results as a bit string, i.e. a bitstream.

CITATION LIST

Non Patent Literatures

NPL 1: ISO/IEC 14496-10 Advanced Video Coding
NPL 2: "Test Model under Consideration," Document: JCTVC-B205, Joint Collaborative Team on Video Coding (JCT-VC) of ITU-T SG16 WP3 and ISO/IEC JTC1/SC29/WG11 2nd Meeting: Geneva, CH, 21-28 Jul. 2010

SUMMARY OF INVENTION

Technical Problem

NPL 1 discloses general intra prediction. On the other hand, referring to 5.1.1.3.1 Specification of intra planar prediction in Test Model under Consideration (TMuC scheme) of NPL 2, a new concept of intra prediction called planar prediction is introduced.

In planar prediction, a prediction error quantization index (planar_qdelta_indicator) corresponding to a bottom right image (see FIG. 10) of the block to be encoded and the plus or minus sign information (planar_sign) are transmitted from the video encoding device to the video decoding device based on prediction encoding using reference images. Planar_qdelta_indicator is the quantization index of a prediction error value (delta) of the bottom right image that is predicted using an average value DCpred of pixels adjacent to the upper and left side of a planar prediction block. As quantization of delta, linear quantization corresponding to the range is applied. Note that planar_sign is the plus or minus sign information on delta (1: minus, 0: plus). Calculations of planar_qdelta_indicator and planar_sign are shown in Equation (1) and Equation (2) below.

$$\text{delta}=p[PuPartSize-1,PuPartSize-1]-DCpred;$$

$$\text{planar\_sign}=(\text{delta}<0)?1:0; \quad (1)$$

$$A\text{delta}=|\text{delta}|;$$

if($A$delta>63)

$$\text{planar\_qdelta\_indicator}=(A\text{delta}>>3)+14;$$

else if($A$delta>9)

$$\text{planar\_qdelta\_indicator}=(A\text{delta}>>2)+6;$$

else if($A$delta>3)

$$\text{planar\_qdelta\_indicator}=(A\text{delta}>>1)+2;$$

else $$\text{planar\_qdelta\_indicator}=A\text{delta}; \quad (2)$$

Note that p[PuPartSize−1, PuPartSize−1] is a pixel of the bottom right image. The Dcpred calculation method is described in detail in 5.1.1.3.3.3 Specification of Intra DC prediction mode of NPL 2.

Then, in planar prediction, the bottom right image is reconstructed using a peripheral reference image of the planar prediction block, and planar_qdelta_indicator and planar_sign transmitted. The reconstructed prediction error value qdelta is calculated based on planar_qdelta_indicator and planar_sign to set the reconstructed pixel value of the bottom right image to qdelta+Dcpred. The calculation of qdelta is shown in Equation (3) below.

if(planar_$q$delta_indicator>21)

$$q\text{delta}=((\text{planar\_}q\text{delta\_indicator}-14)<<3)+4;$$

else if(planar_$q$delta_indicator>9)

$$q\text{delta}=((\text{planar\_}q\text{delta\_indicator}-6)<<2)+2;$$

else if(planar_$q$delta_indicator>3)

$$q\text{delta}=(\text{planar\_}q\text{delta\_indicator}-2)<<1;$$

else $$q\text{delta}=\text{planar\_}q\text{delta\_indicator};$$

if(planar_sign==1)

$$q\text{delta}=-1*q\text{delta} \quad (3)$$

Then, based on one-dimensional linear interpolation between the reconstructed pixel value of the bottom right image (see FIG. 10) and a top right pixel value of the peripheral reference image of the planar prediction block, a prediction image in the rightmost column of the planar prediction block (see FIG. 11) is calculated. Similarly, based on one-dimensional linear interpolation between the reconstructed pixel value of the bottom right image (see FIG. 10) and a bottom left pixel value of the peripheral reference image of the planar prediction block, a prediction image in the bottom row of the planar prediction block (see FIG. 11) is calculated.

Lastly, as shown in FIG. 12, a prediction image in the remaining area (a prediction image other than those in the rightmost column and the bottom row in FIG. 12, i.e. an internal prediction image of planar prediction block boundaries) is calculated by two-dimensional linear interpolation. For a block for which planar prediction (hereinafter also called "planar mode") is used, no prediction error (difference between the original signal and an interpolated image) is transmitted. In other words, the prediction image is set intact as a reconstructed image.

Therefore, for the planar intra block boundaries, planar mode filtering for interpolating respective pixels of adjacent blocks is applied instead of general deblocking filtering. A specific deblocking filter process is described in 5.4.1 Deblocking filter process, Planar mode filtering, in NPL 2. In planar mode filtering, the block boundary of adjacent planar mode blocks (see FIG. 13) is one-dimensionally interpolated using images in predetermined positions on both sides of the block boundary (see FIG. 14). In the case of a horizontal block boundary, an M/4-th image on the left hand of the block boundary and an M/4-th image on the right hand are the images in the predetermined positions. In the case of a vertical block boundary, an M/4-th image on the upper side of the block boundary and an M/4-th image on the lower side are the images in the predetermined positions.

In the video encoding device shown in FIG. 8, the quantizer/inverse quantizer 107 receives, as delta, input of a value obtained by subtracting the average value DCpred of adjacent pixels from the bottom right pixel value of the input MB block to obtain planar_qdelta_indicator and planar_sign by solving Equation (1) and Equation (2) mentioned above, and supplies the results to the entropy encoder 103.

The entropy encoder 103 entropy-encodes planar_qdelta_indicator and planar_sign as auxiliary information.

The quantizer/inverse quantizer 107 further calculates qdelta by Equation (3) mentioned above, and supplies qdelta to the adaptive linear interpolator 108.

The adaptive linear interpolator 108 performs one-dimensional linear interpolation between a reconstructed pixel value (qdelta+Dcpred) of the bottom right image and the top right pixel value of the reference image to obtain a prediction image in the rightmost column of the planar prediction block (see FIG. 11). The adaptive linear interpolator 108 also performs one-dimensional linear interpolation between qdelta+Dcpred and the bottom left pixel value of the peripheral reference image of the planar prediction block to obtain a prediction image in the bottom row of the planar prediction block.

The adaptive linear interpolator 108 further performs two-dimensional linear interpolation to obtain an internal prediction image of the planar prediction block boundaries (see FIG. 12). The prediction images obtained by the adaptive linear interpolator 108 are stored as reconstructed images in the picture buffer 105 through the switch 121.

When the absolute value of qdelta is less than the planar block size, it means that the dynamic range representing a smoothly varying signal in the section of the planar block size is insufficient and hence simple linear interpolation leads to the occurrence of a gradient distortion in a prediction image. For example, when the planar block size is 16, the dynamic range required to represent a smoothly varying signal (e.g., a signal monotonically increasing one pixel by one pixel) is 16. Thus, when the absolute value of qdelta is greater than or equal to 16, even simple linear interpolation can reproduce the smoothly varying signal, while when the absolute value of qdelta is less than 16, simple linear interpolation cannot reproduce the smoothly varying signal and hence a gradient distortion occurs.

It is an object of the present invention to use pseudo-random noise in linear interpolation for calculating a prediction image, based on conditions under which a gradient distortion occurs, to suppress the gradient distortion efficiently in order to prevent the occurrence of the gradient distortion described above.

Solution to Problem

A video encoding device according to the present invention is a video encoding device including planar prediction means using planar prediction, which includes noise injecting means for injecting pseudo-random noise into a prediction image of a planar prediction block when a reconstructed prediction error value for planar prediction is less than a threshold determined by the size of the planar prediction block.

A video decoding device according to the present invention is a video decoding device including planar prediction means using planar prediction, which includes noise injecting means for injecting pseudo-random noise into a prediction image of a planar prediction block when a reconstructed prediction error value for planar prediction is less than a threshold determined by the size of the planar prediction block.

A video encoding method according to the present invention is a video encoding method using planar prediction, which includes injecting pseudo-random noise into a prediction image of a planar prediction block when a reconstructed prediction error value for planar prediction is less than a threshold determined by the size of the planar prediction block.

A video decoding method according to the present invention includes injecting pseudo-random noise into a prediction image of a planar prediction block when a reconstructed prediction error value for planar prediction is less than a threshold determined by the size of the planar prediction block.

A video encoding program according to the present invention causes a computer to execute a planar prediction process, and a process of injecting pseudo-random noise into a prediction image of a planar prediction block when a reconstructed prediction error value for planar prediction is less than a threshold determined by the size of the planar prediction block.

A video decoding program according to the present invention causes a computer to execute a planar prediction process, and a process of injecting pseudo-random noise into a prediction image of a planar prediction block when a reconstructed prediction error value for planar prediction is less than a threshold determined by the size of the planar prediction block.

Advantageous Effect of Invention

According to the present invention, in a video encoding technique based on planar prediction, conditions under which a gradient distortion occurs are detected and pseudo-random noise is used in linear interpolation for calculating a prediction image so that a gradient distortion can be suppressed efficiently.

DESCRIPTION OF EMBODIMENTS

Exemplary Embodiment 1

This exemplary embodiment describes a video encoding device for detecting conditions under which a gradient distortion occurs and using pseudo-random noise in linear interpolation for calculating a prediction image to suppress the gradient distortion.

Figure 1:
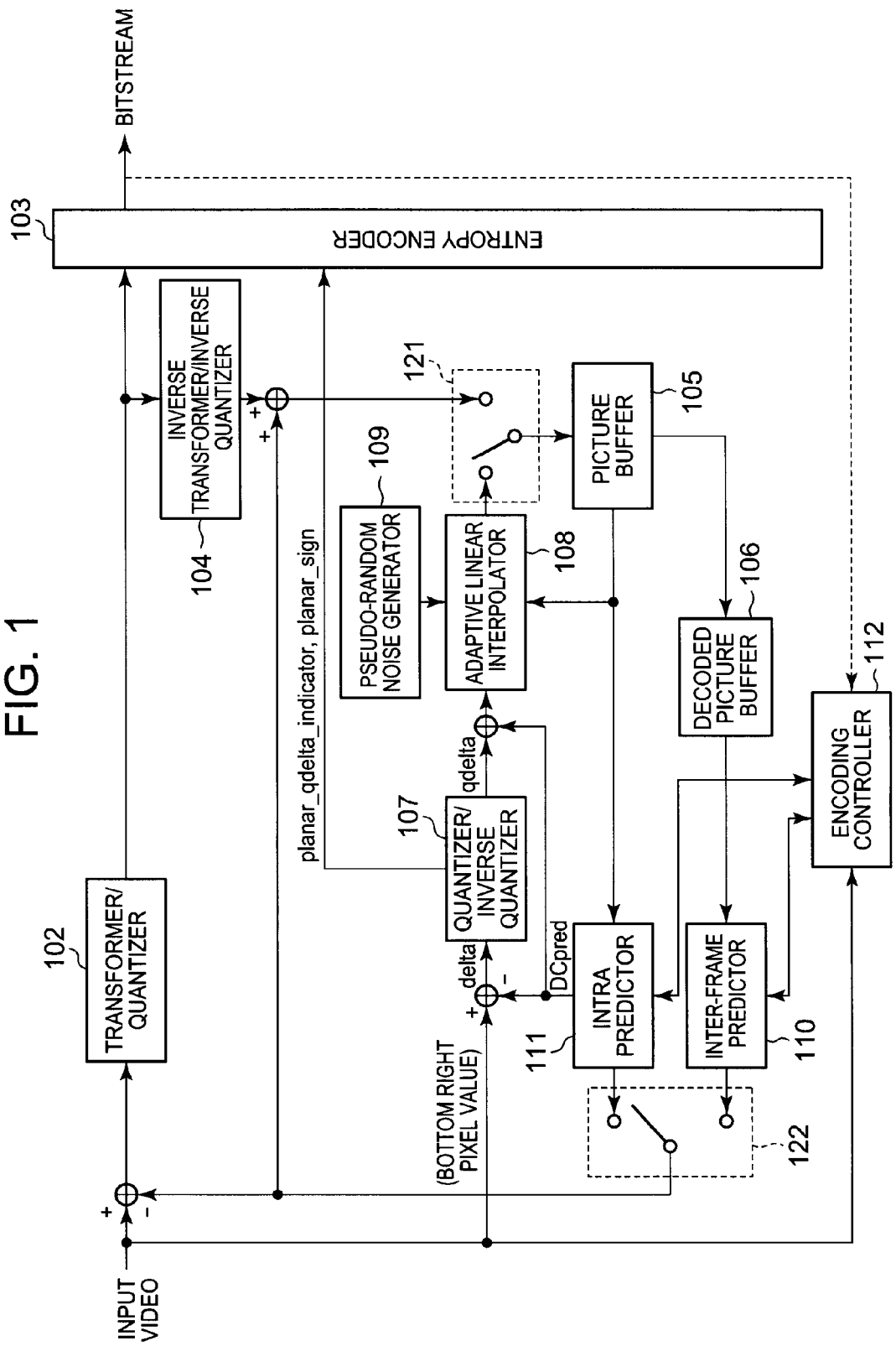
FIG. 1 is a block diagram showing the structure of a video encoding device in Exemplary Embodiment 1.

As shown in FIG. 1, the video encoding device in the exemplary embodiment includes a transformer/quantizer 102, an entropy encoder 103, an inverse transformer/inverse quantizer 104, a picture buffer 105, a decoded picture buffer 106, a quantizer/inverse quantizer 107, an adaptive linear interpolator 108, a pseudo-random noise generator 109, an inter-frame predictor (inter predictor) 110, an intra predictor 111, an encoding controller 112, a switch 121, and a switch 122.

The following describes the operation of each unit while focusing only on pixel values of luminance for simplicity's sake.

The intra predictor 111 generates an intra prediction signal using a reconstructed image stored in the picture buffer 105 and having the same display time as a current frame.

The inter-frame predictor 110 generates an inter-frame prediction signal using a reference image different in display time from the current frame and stored in the decoded picture buffer 106.

The encoding controller 112 compares the intra prediction signal and the inter-frame prediction signal with an input MB stored in an MB buffer, and selects a prediction signal that reduces the energy of a prediction error image block to control the switch 122. Information associated with the selected prediction signal (the intra prediction mode, the intra prediction direction, and information associated with inter-frame prediction) is supplied to the entropy encoder 103.

Based on the input MB or the prediction error image block, the encoding controller 112 further selects a base block size of integer DCT (Discrete Cosine Transform) suitable for frequency transform of the prediction error image block. Information on the selected base size of integer DCT is supplied to the entropy encoder 103.

The inverse transformer/inverse quantizer 104 inverse-quantizes a transform/quantization value with a quantization step width Qs. The inverse transformer/inverse quantizer 104 further performs inverse frequency transform of a frequency transform coefficient obtained by the inverse quantization. The prediction signal (the intra prediction signal or the inter prediction signal) is added to a reconstructed prediction error image obtained by the inverse frequency transform, and the result is supplied to the picture buffer 105 through the switch 121.

A reconstructed image block in which the prediction signal is added to the reconstructed prediction error image block is stored in the picture buffer 105 until all the MBs contained in the current frame are encoded.

In the exemplary embodiment, the intra predictor 111 outputs an average value DCpred of pixels adjacent to the upper and left side of a planar prediction block. The quantizer/inverse quantizer 107 receives, as delta, input of a value obtained by subtracting the average value DCpred of the adjacent pixels from a bottom right pixel value of the input MB block, calculates planar_qdelta_indicator and planar_sign by Equation (1) and Equation (2) mentioned above, and supplies the results to the entropy encoder 103.

The quantizer/inverse quantizer 107 further calculates qdelta (reconstructed prediction error value) by Equation (3) mentioned above, and supplies qdelta to the adaptive linear interpolator 108. A reconstructed pixel value (qdelta+Dcpred) is also supplied to the adaptive linear interpolator 108.

Figure 11:
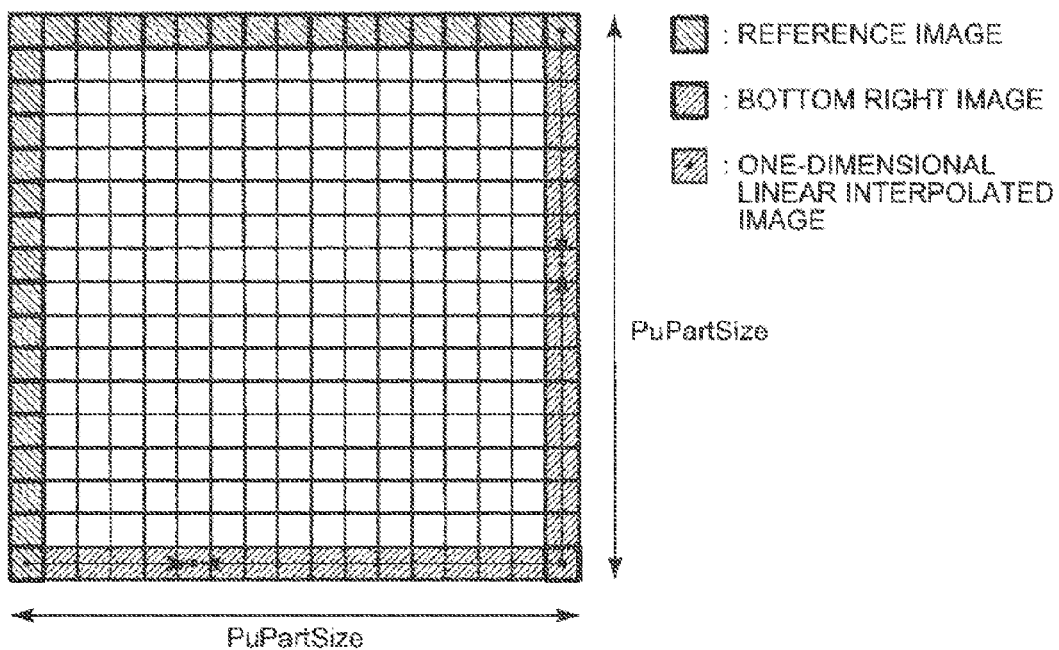
FIG. 11 is an explanatory diagram for describing planar prediction.

The adaptive linear interpolator 108 performs one-dimensional linear interpolation between qdelta+Dcpred and a top right pixel value of a reference image to obtain a prediction image in the rightmost column of the planar prediction block (see FIG. 11). The adaptive linear interpolator 108 also performs one-dimensional linear interpolation between qdelta+Dcpred and a bottom left pixel value of a peripheral reference image of the planar prediction block to obtain a prediction image in the bottom row of the planar prediction block.

Figure 14:
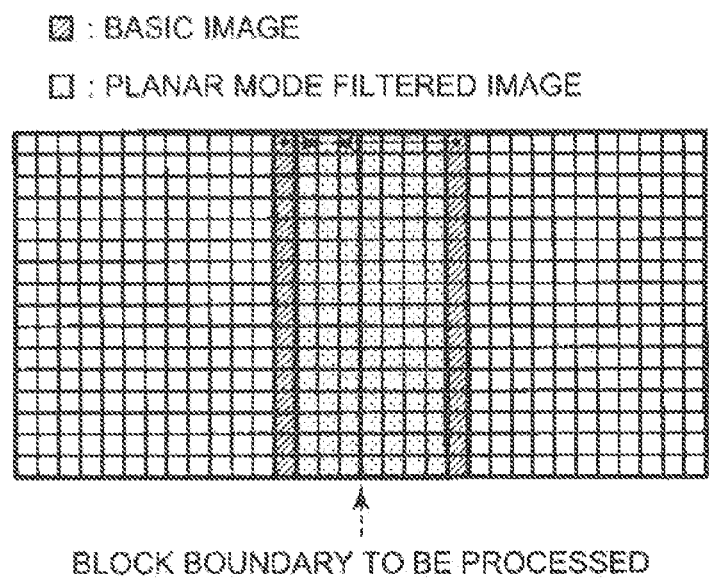
FIG. 14 is an explanatory diagram for describing planar mode filtering.

The adaptive linear interpolator 108 further performs two-dimensional linear interpolation to obtain an internal prediction image of a planar prediction block boundary (see FIG. 14). The prediction images obtained by the adaptive linear interpolator 108 are stored as reconstructed images in the picture buffer 105 through the switch 121.

The entropy encoder 103 entropy-encodes auxiliary information and a quantization index, and outputs the results as a bit string, i.e. a bitstream.

Figure 8:
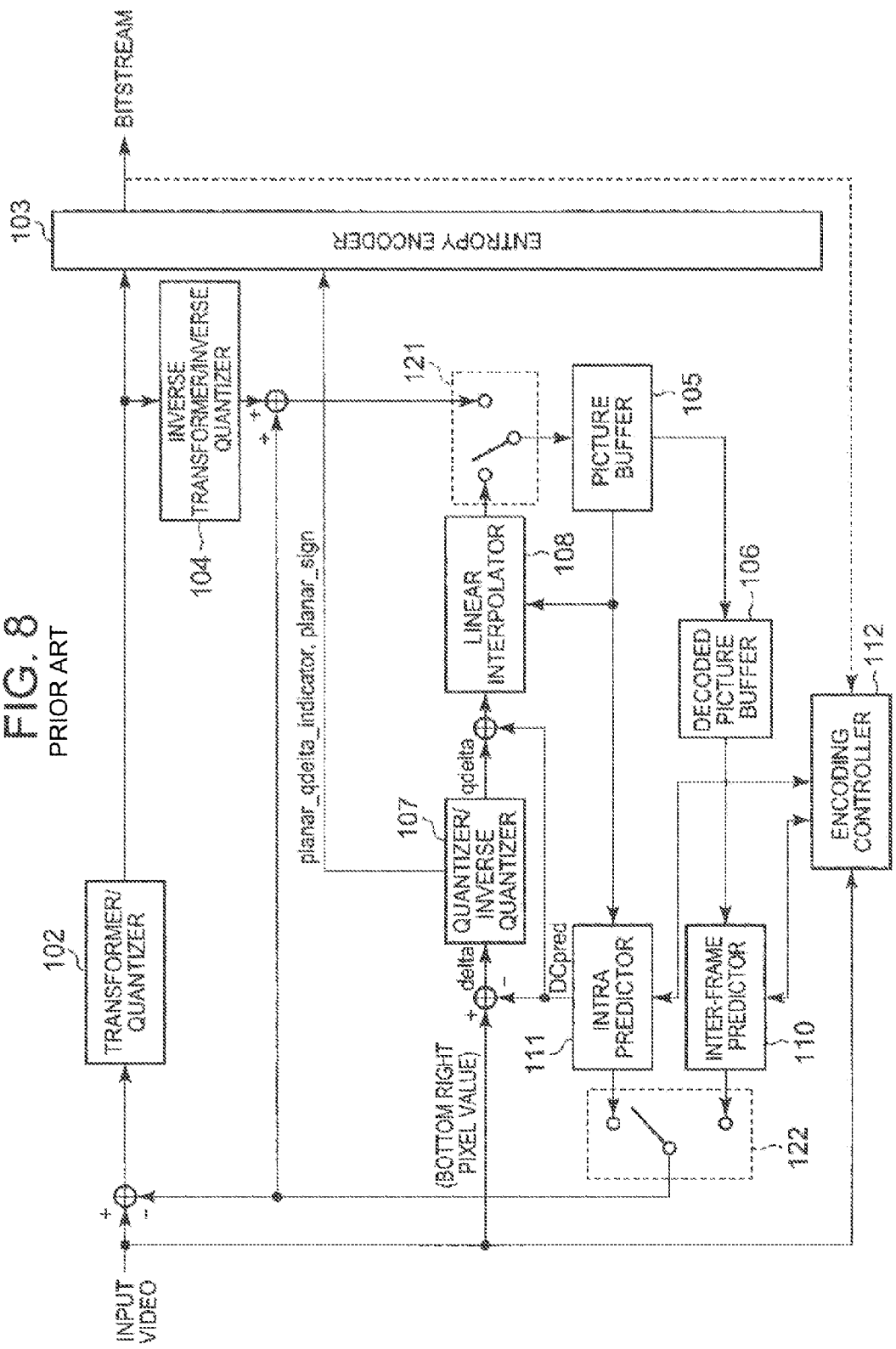
FIG. 8 is a block diagram showing the structure of a general video encoding device.
Figure 9:
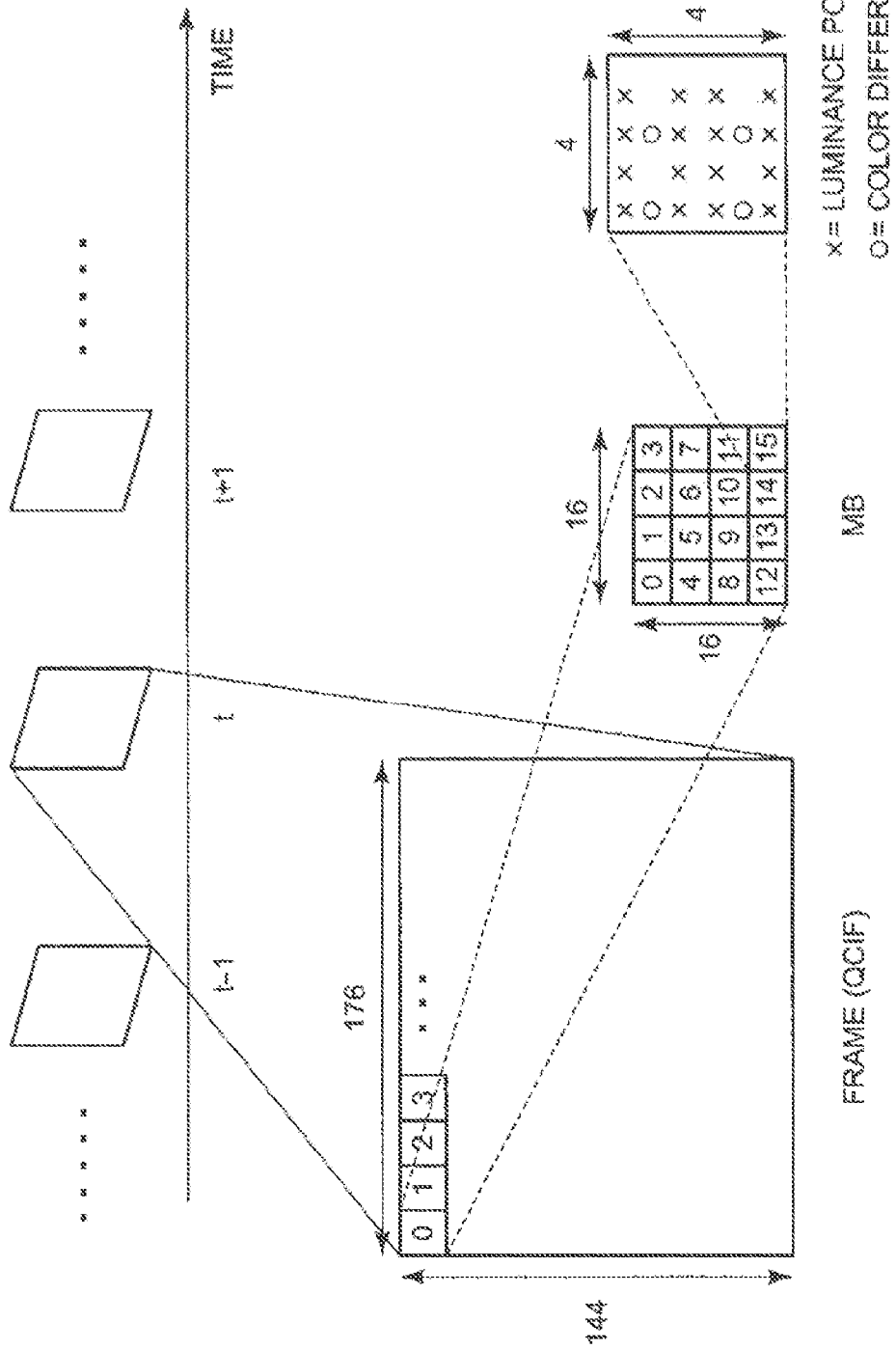
FIG. 9 is an explanatory diagram showing an example of block division.
Figure 10:
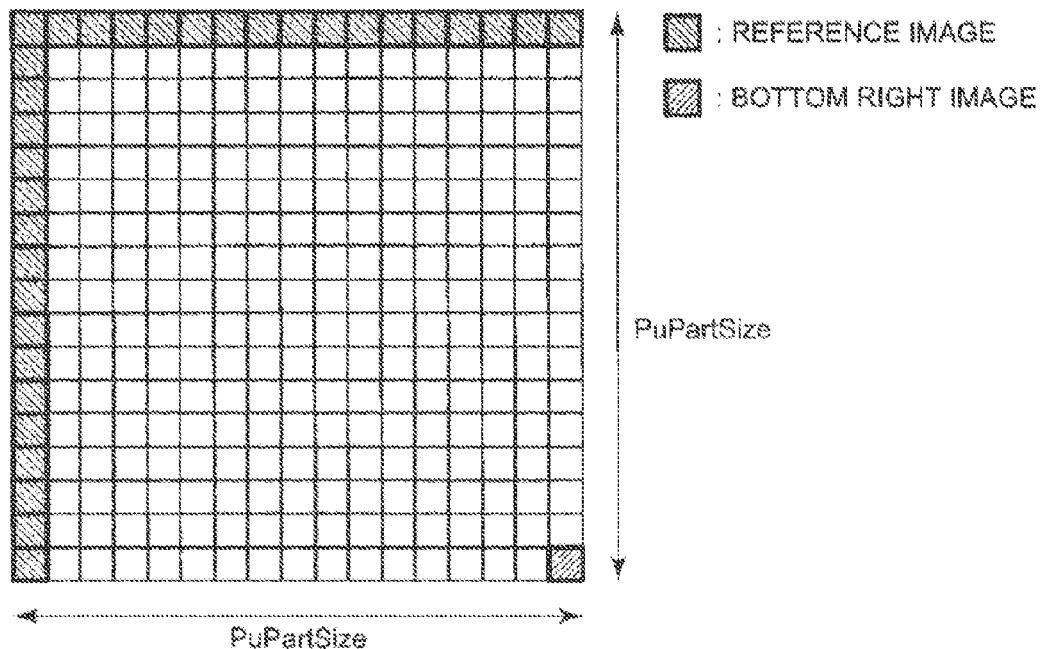
FIG. 10 is an explanatory diagram for describing planar prediction.

From a comparison between the video encoding device in the exemplary embodiment shown in FIG. 1 and the general video encoding device shown in FIG. 8, it is found that the pseudo-random noise generator 109 is added.

When the reconstructed prediction error value for planar prediction is less than a threshold determined by the size of the planar prediction block, the pseudo-random noise generator 109 injects pseudo-random noise into the prediction images of the planar prediction block.

A process of injecting pseudo-random noise is specifically described below.

Referring to 5.1.1.3.1 Specification of intra planar prediction in NPL 2, prediction signals predPartL[x, y] (x, y=0, ..., PuPartSize−1) on which the pseudo-random noise is reflected are generated as follows. In Equation (4), PuPartSize is the planar block size.

$$predPartL[x,y] = \text{Clip}_{0-255}(((PuPartSize-(y+1))*TR(x) + (y+1)*BR(x) + (PuPartSize-(x+1))*LC(y) + (x+1)*RC(y) + \text{Dither}[x,y])/(PuPartSize*2)) \quad (4)$$

TR is expressed as follows.

If pixel p[x, −1] (x=0, ..., PuPartSize−1) is available for intra prediction:

$$TR(i) = p[x,-1](i=0, ..., PuPartSize-1)$$

Otherwise if pixel p[−1, y] (y=0, ..., PuPartSize−1) is available for intra prediction:

$$TR(i) = ((PuPartSize-(i+1))*M(-1,0) + (i+1)*BRS + (PuPartSize>>1))/PuPartSize (i=0, ..., PuPartSize-1)$$

Otherwise:

$$TR(i) = 128 (i=0, ..., PuPartSize-1)$$

LC is expressed as follow.

If pixel p[−1, y] (y=0, ..., PuPartSize−1) is available for intra prediction:

$$LC(i) = p[-1,i](i=0, ..., PuPartSize-1)$$

Otherwise if pixel p[x, −1] (x=0, ..., PuPartSize−1) is available for intra prediction:

$$LC(j) = ((PuPartSize-(j+1))*M(0,-1) + (j+1)*BRS + (PuPartSize>>1))/PuPartSize$$

Otherwise:

$$LC(i) = 128 (i=0, ..., PuPartSize-1)$$

BR is expressed as follows:

$$BR(i) = ((PuPartSize-(i+1))*LC[PuPartSize-1] + (i+1)*BRS + (PuPartSize>>1))/PuPartSize$$
$$i=0, ..., PuPartSize-1$$

RC is expressed as follows:

$$RC(i) = ((PuPartSize-(i+1))*TR[PuPartSize-1] + (i+1)*BRS + (PuPartSize>>1))/PuPartSize$$

BRS is expressed as follows:

$$BRS = DC + planar\_delta\_y$$

Planar_delta_y is qdelta for luminance. Further, DC is a DC predicted value as described in 5.1.1.3.3 of NPL 2.

Note that Equation (4) corresponds to an equation where "PuPartSize" (the last element on the right-hand side) is replaced by "Dither [x, y]" in a corresponding equation described in 5.1.1.3.1 Specification of intra planar prediction of NPL 2.

Therefore, when no pseudo-random noise is injected, Dither [x, y] in Equation (4) is set as follows:

Dither[x,y]=PuPartSize

Figure 12:
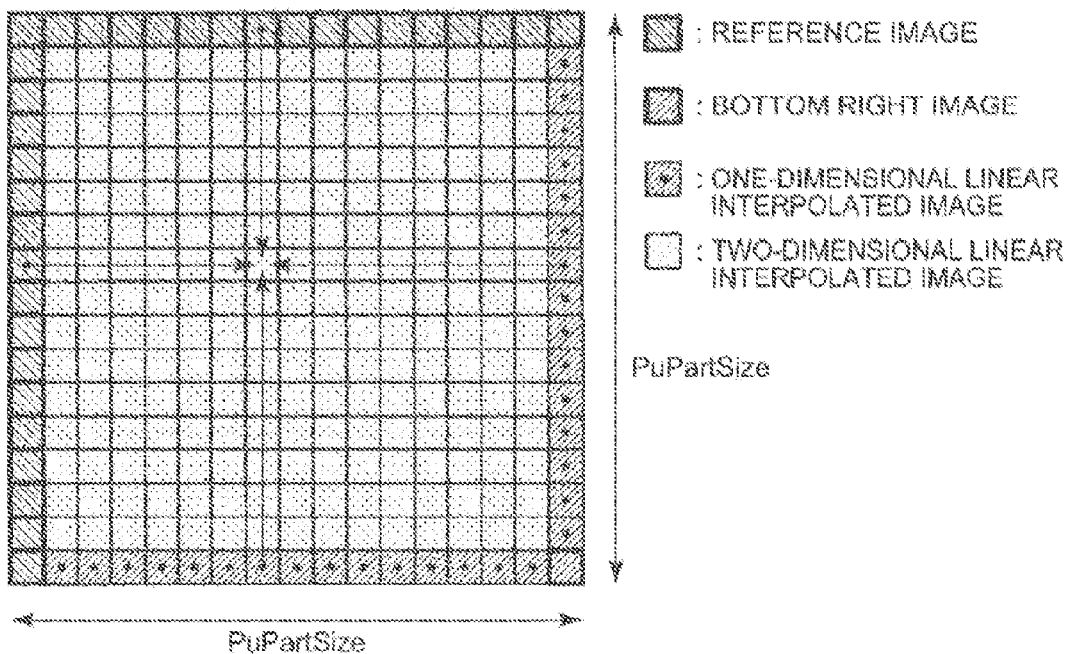
FIG. 12 is an explanatory diagram for describing planar prediction.
Figure 13:
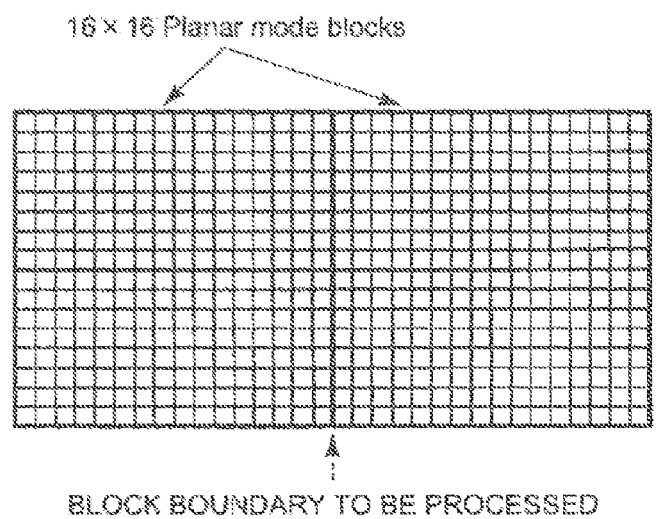
FIG. 13 is an explanatory diagram for describing planar mode filtering.

When pseudo-random noise is injected, Dither [x, y] in Equation (4) for the internal prediction image (prediction images other than those in the rightmost column and the bottommost row in FIG. 12, i.e. (pixels in a system of coordinates x,y=1, . . . , PuPartSize−2)) is set as follows:

Dither[x,y]=NoiseTable[PuPartSize*y+x]

Dither [x, y] in Equation (4) for prediction images other than those in the rightmost column and the bottommost row is set as follows:

Dither[x,y]=PuPartSize

Note that the values of NoiseTable [PuPartSize*y+x] are 0 to 2*PuPartSize. NoiseTable [i](i=0, . . . , 2*PuPartSize−1) denotes values obtained by normalizing pseudo-random numbers taking 2*PuPartSize as the variable to [0,1] as an example.

In the exemplary embodiment, the generation method for uniformly distributed pseudo-random variables rv[i] (i=0, . . . , PuPartSize*PuPartSize−1) represented as [0,1] and used to determine NoiseTable [i] is not particularly limited, but it is assumed that a generator for uniformly distributed pseudo-random variables can be reset in predetermined units of encoding.

The predetermined units of encoding include, for example, a unit of first CU (Coding Unit) in each frame and a unit of each CU of multiple CUs in each frame. By resetting the generator for uniformly distributed pseudo-random variables in predetermined units of encoding, random accessibility for video decoding and parallel processing performance of video encoding and video decoding can be improved. For example, in a generator for uniformly distributed pseudo-random variables based on a linear congruential method, it is only necessary to reset the initial value rv[0] with a predetermined value in predetermined units of encoding.

In the exemplary embodiment, it is also assumed that a threshold used to determine whether to inject pseudo-random noise is a value obtained by multiplying the planar block size PuPartSize by 0.5 as an example. In other words, when |planar_delta_y| is greater than or equal to 0.5*PuPartSize, pseudo-random noise is not injected, while when |planar_delta_y| is less than 0.5*PuPartSize, pseudo-random noise is injected. Planar_delta_y less than the threshold means that the dynamic range representing a smoothly varying signal in the section of the planar block size is insufficient and hence a gradient distortion will occur unless Dither [x, y] is injected.

Figure 2:
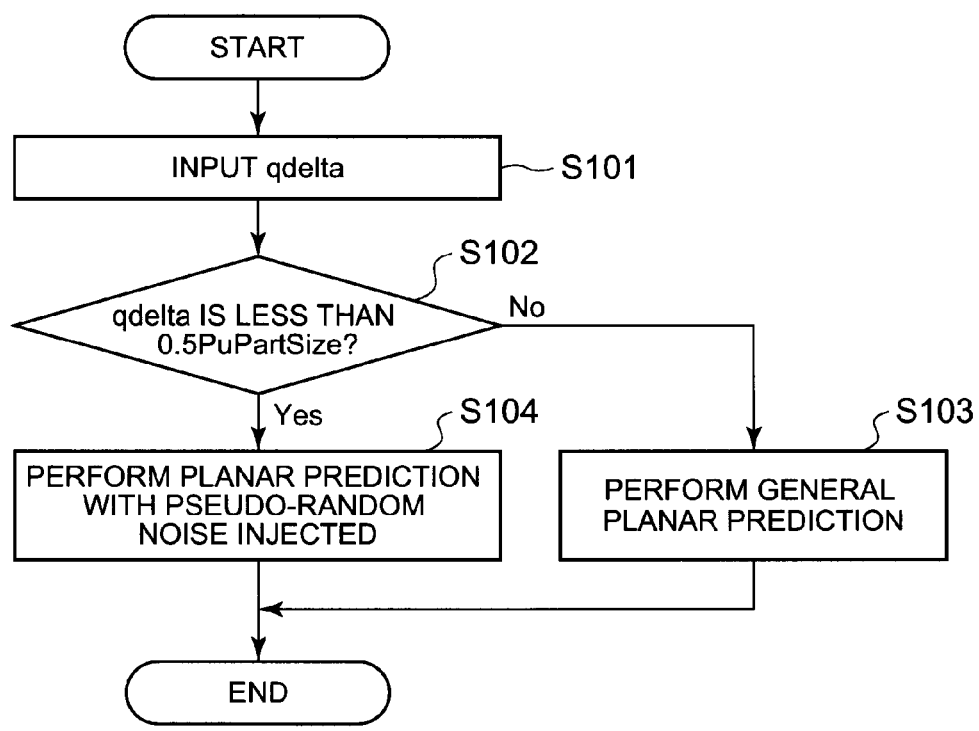
FIG. 2 is a flowchart showing the operation of an adaptive linear interpolator in the video encoding device.

FIG. 2 is a flowchart showing the operation of the adaptive linear interpolator 108 in the exemplary embodiment. In the exemplary embodiment, when a reconstructed prediction error value (qdelta) is input (step S101), the adaptive linear interpolator 108 determines whether the value of qdelta (specifically, the absolute value of planar_delta_y) is less than 0.5*PuPartSize (step S102). When qdelta is greater than or equal to 0.5*PuPartSize, planar prediction is performed like in the case of the general video encoding device shown in FIG. 8 without executing the process of injecting pseudo-random noise (step S103).

On the other hand, when qdelta is less than 0.5*PuPartSize, the adaptive linear interpolator 108 receives, as input, pseudo-random noise (Dither [x, y]) generated by the pseudo-random noise generator 109 to generate, according to Equation (4) mentioned above, a prediction image of the planar prediction block with the pseudo-random noise injected (step S104).

The video encoding device in the exemplary embodiment generates a bitstream according to the process mentioned above.

In the exemplary embodiment, the threshold is set to 0.5*PuPartSize, but a threshold obtained by multiplying PuPartSize by a value closer to 1.0 than 0.5 may be used.

As described above, when the reconstructed prediction error value for planar prediction is less than the threshold determined by the size of the planar prediction block, the video encoding device in the exemplary embodiment injects pseudo-random noise into the prediction image of the planar prediction block. This can suppress a gradient distortion caused by the fact that the dynamic range representing a smoothly varying signal in the section of the planar block size is insufficient.

Exemplary Embodiment 2

This exemplary embodiment describes a video decoding device for detecting conditions under which a gradient distortion occurs and using pseudo-random noise in linear interpolation for calculating a prediction image to suppress the gradient distortion. The video decoding device in the exemplary embodiment is a video decoding device corresponding to the video encoding device in Exemplary Embodiment 1.

Figure 3:
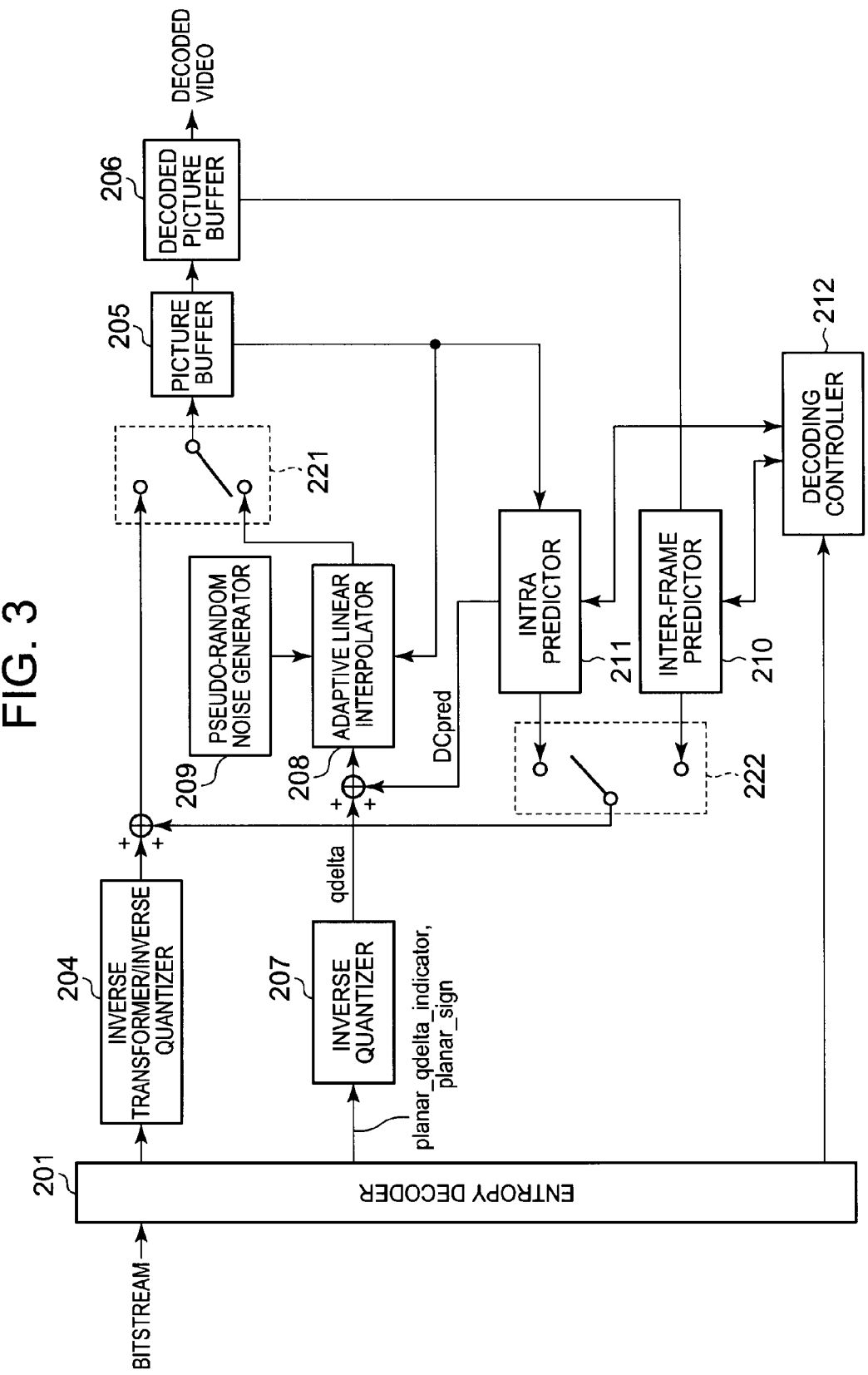
FIG. 3 is a block diagram showing the structure of a video decoding device in Exemplary Embodiment 2.

As shown in FIG. 3, the video decoding device in the exemplary embodiment includes an entropy decoder 201, an inverse transformer/inverse quantizer 204, a picture buffer 205, a decoded picture buffer 206, an inverse quantizer 207, an adaptive linear interpolator 208, a pseudo-random noise generator 209, an inter-frame predictor (inter predictor) 210, an intra predictor 211, a decoding controller 212, and a switch 222.

The entropy decoder 201 entropy-decodes a bitstream, and outputs information associated with a prediction signal of an MB to be decoded, a base size of integer DCT, and a quantization index. The entropy decoder 201 further entropy-decodes planar_qdelta_indicator and planar_sign as auxiliary information.

The inverse transformer/inverse quantizer 204 inverse-quantizes the quantization index supplied from the entropy decoder 201, and performs inverse frequency transform of a quantization representative value in order to return to the original spatial domain.

A reconstructed image block in which a prediction signal is added to the reconstructed prediction error image block returned to the original spatial domain is stored in the picture buffer 205 until all the MBs in the frame being currently decoded are decoded.

The decoded picture buffer 206 stores the reconstructed image as a reference image picture. The image of the reference image picture is used as a reference image for generating an inter-frame prediction signal. The reference image picture is output at appropriate display timing as a decompressed frame.

The inter-frame predictor 210 generates an inter-frame prediction signal using a reference image different in display time from the frame being currently decoded and stored in the decoded picture buffer 206.

The intra predictor 211 generates an intra prediction signal using a reconstructed image having the same display time as the frame being currently decoded and stored in the picture buffer 205.

The decoding controller 212 controls the switch 222 based on entropy-decoded inter-frame prediction to supply the intra prediction signal or the inter-frame prediction signal.

The inverse quantizer 207 calculates qdelta by Equation (3) mentioned above, and supplies qdelta to the adaptive linear interpolator 208. A reconstructed pixel value (qdelta+Dcpred) is also supplied to the adaptive linear interpolator 208.

In the exemplary embodiment, the intra predictor 211 outputs an average value DcCpred of pixels adjacent to the upper and left side of the planar prediction block. The adaptive linear interpolator 208 performs one-dimensional linear interpolation between the reconstructed pixel value (qdelta+Dcpred) of a bottom right image and a top right pixel value of the reference image to obtain a prediction image in the rightmost column of the planar prediction block (see FIG. 11). The adaptive linear interpolator 208 also performs one-dimensional linear interpolation between qdelta+Dcpred and a bottom left pixel value of a peripheral reference image of the planar prediction block to obtain a prediction image in the bottom row of the planar prediction block.

The adaptive linear interpolator 208 further performs two-dimensional linear interpolation to obtain an internal prediction image of a planar prediction block boundary (see FIG. 14). The prediction images obtained by the adaptive linear interpolator 208 are stored as reconstructed images in the picture buffer 205 through the switch 221.

Figure 4:
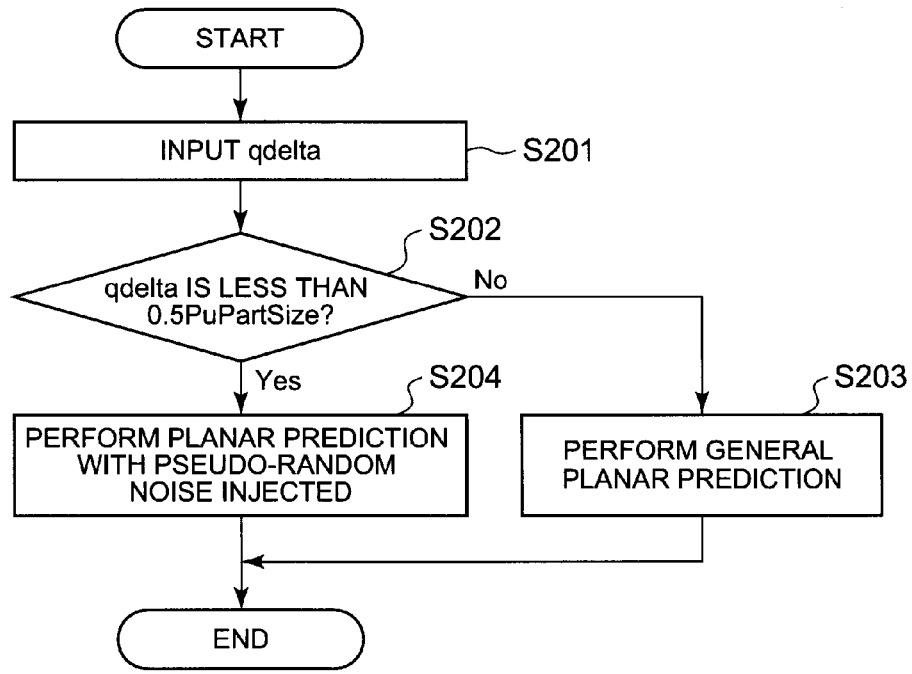
FIG. 4 is a flowchart showing the operation of an adaptive linear interpolator in the video decoding device.

FIG. 4 is a flowchart showing the operation of the adaptive linear interpolator 208. When a reconstructed prediction error value (qdelta) is input (step S201), the adaptive linear interpolator 208 determines whether the value of qdelta (specifically, the absolute value of planar_delta_y) is less than 0.5 (step S202), like the adaptive linear interpolator 108 in Exemplary Embodiment 1. When qdelta is greater than or equal to 0.5, planar prediction is performed like in the case of the general video decoding device without executing the process of injecting pseudo-random noise (step S203).

On the other hand, when qdelta is less than 0.5*PuPartSize, the adaptive linear interpolator 208 receives, as input, pseudo-random noise (Dither [x, y]) generated by the pseudo-random noise generator 209 to generate, according to Equation (4) mentioned above, a prediction image of the planar prediction block with the pseudo-random noise injected (step S204).

The pseudo-random noise generator 209 generates pseudo-random noise like the pseudo-random noise generator 109 in Exemplary Embodiment 1.

The video decoding device in the exemplary embodiment decompresses a bitstream according to the process mentioned above.

In the exemplary embodiment, the threshold is set to 0.5*PuPartSize, but a threshold obtained by multiplying PuPartSize by a value closer to 1.0 than 0.5 may be used.

When the reconstructed prediction error value for planar prediction is less than the threshold determined by the size of the planar prediction block, the video decoding device in the exemplary embodiment injects pseudo-random noise into the prediction image of the planar prediction block, like the video encoding device in Exemplary Embodiment 1. This can suppress a gradient distortion caused by the fact that the dynamic range representing a smoothly varying signal in the section of the planar block size is insufficient.

Each of the aforementioned exemplary embodiments can be implemented in hardware or in a computer program.

Figure 5:
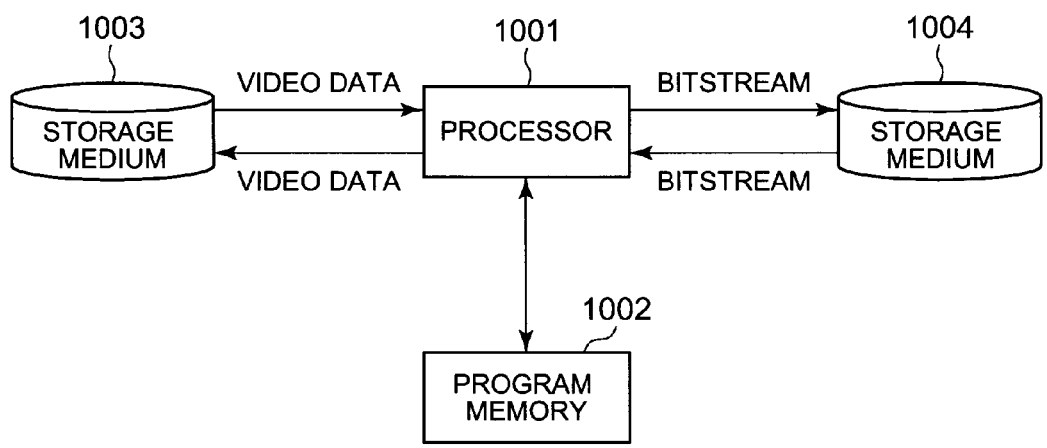
FIG. 5 is a block diagram showing a configuration example of an information processing system capable of implementing the functions of a video encoding device and a video decoding device according to the present invention.

An information processing system shown in FIG. 5 includes a processor 1001, a program memory 1002, a storage medium 1003, and a storage medium 1004. The storage medium 1003 and the storage medium 1004 may be different storage media, or storage areas on the same storage medium. A magnetic medium such as a hard disk can be used as the storage medium.

In the information processing system shown in FIG. 5, a program for carrying out the function of each block (except the buffer block) shown in each of FIG. 1 and FIG. 3 is stored in the program memory 1002. The processor 1001 performs processing according to the program stored in the program memory 1002 to carry out the functions of the video encoding device or the video decoding device shown in FIG. 1 or FIG. 3, respectively.

Figure 6:
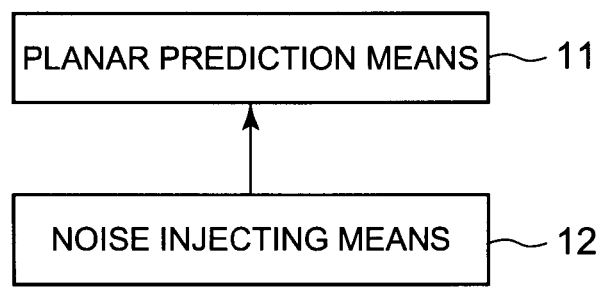
FIG. 6 is a block diagram showing a main part of a video encoding device according to the present invention.

FIG. 6 is a block diagram showing a main part of a video encoding device according to the present invention. As shown in FIG. 6, the video encoding device according to the present invention includes planar prediction means 11 using planar prediction (the adaptive linear interpolator 108 as an example), and noise injecting means 12 (the adaptive linear interpolator 108 and the pseudo-random noise generator 109 as an example) for injecting pseudo-random noise into a prediction image of a planar prediction block when a reconstructed prediction error value for planar prediction is less than a threshold determined by the size of the planar prediction block.

Figure 7:
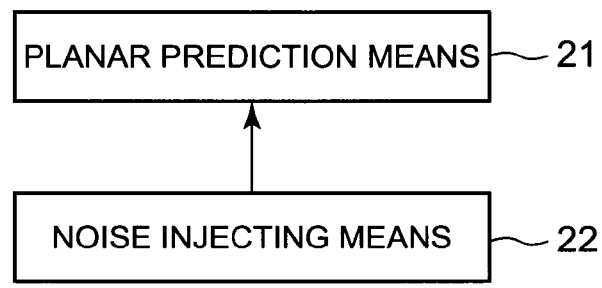
FIG. 7 is a block diagram showing a main part of a video decoding device according to the present invention.

FIG. 7 is a block diagram showing a main part of a video decoding device according to the present invention. As shown in FIG. 7, the video decoding device according to the present invention includes planar prediction means 21 using planar prediction (the adaptive linear interpolator 208 as an example), and noise injecting means 22 (the adaptive linear interpolator 208 and the pseudo-random noise generator 209 as an example) for injecting pseudo-random noise into a prediction image of a planar prediction block when a reconstructed prediction error value for planar prediction is less than a threshold determined by the size of the planar prediction block.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2010-289940, filed on Dec. 27, 2010, the disclosures of which are incorporated herein in their entirety.

REFERENCE SIGNS LIST 11 planar prediction means
12 noise injecting means
21 planar prediction means
22 noise injecting means
102 transformer/quantizer
103 entropy encoder
104 inverse transformer/inverse quantizer
105 picture buffer
106 decoded picture buffer
107 quantizer/inverse quantizer
108 adaptive linear interpolator
109 pseudo-random noise generator
110 inter-frame predictor
111 intra predictor
112 encoding controller 121 switch
122 switch
202 entropy decoder
204 inverse transformer/inverse quantizer
205 picture buffer
206 decoded picture buffer
207 inverse quantizer
208 adaptive linear interpolator
209 pseudo-random noise generator
210 inter-frame predictor
211 intra predictor
212 decoding controller
1001 processor
1002 program memory
1003 storage medium
1004 storage medium

The invention claimed is:

1. A video encoding device including a planar prediction unit using planar prediction, comprising: a processor that implements a noise injector configured to inject pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

2. A video decoding device including a planar prediction unit using planar prediction, comprising: a processor that implements a noise injector configured to inject pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

3. A video encoding method using planar prediction, comprising: injecting pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

4. A video decoding method using planar prediction, comprising: injecting pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

5. A non-transitory computer readable information recording medium storing a video encoding program, when executed by a processor, performs a method comprising: planar predicting; and injecting pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

6. A non-transitory computer readable information recording medium storing a video decoding program, when executed by a processor, performs a method comprising: planar predicting; and injecting pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

7. A video encoding device comprising: a processor configured to inject pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

8. A video decoding device comprising: a processor configured to inject pseudo-random noise into a prediction image of a planar prediction block in response to a reconstructed prediction error value for planar prediction being less than a threshold which is calculated based on a size of the planar prediction block; and
   wherein the threshold is a calculated by multiplying the size of the planar prediction block by a constant that is greater than or equal to 0.5 and less than 1.0.

* * * * *